June 11, 1935.  G. F. FORD ET AL  2,004,604
BOX MAKING MACHINE
Filed Feb. 14, 1933   6 Sheets-Sheet 1

INVENTORS
GEORGE F. FORD
WALTER F. PITTMAN
BY
THEIR ATTORNEYS.

INVENTORS
GEORGE F. FORD
WALTER F. PITTMAN
BY
THEIR ATTORNEYS.

June 11, 1935.  G. F. FORD ET AL  2,004,604
BOX MAKING MACHINE
Filed Feb. 14, 1933   6 Sheets-Sheet 5

INVENTORS
GEORGE F. FORD
WALTER F. PITTMAN
BY
THEIR ATTORNEYS.

Patented June 11, 1935

2,004,604

UNITED STATES PATENT OFFICE 2,004,604

BOX MAKING MACHINE

George F. Ford, Los Angeles, and Walter F. Pittman, Huntington Park, Calif., assignor to Fibreboard Products Inc., San Francisco, Calif., a corporation of Delaware Application February 14, 1933, Serial No. 656,692

14 Claims. (Cl. 93—47)

Our invention relates to a machine for making boxes, and more particularly to a machine for making boxes from sheet material, such as fibreboard.

It is among the objects of our invention to provide a machine into which a supply of sheet material is fed, and out of which the completed boxes are delivered.

Another object of our invention is to provide a machine of the character described in which improved means are provided for feeding the material through the machine.

Another object of our invention is to provide a machine in which blanks from which the boxes are folded are treated with a protective material.

Another object of our invention includes the provision of improved means for folding the blanks into boxes.

Still another object of our invention is to provide means for applying glue to the blanks prior to the folding operation, and to provide improved means for holding the newly formed boxes so that the glue may set properly.

A further object of our invention is to provide improved means for delivering the boxes from the machine.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 3 is a side elevational view showing other portions of the machine. Figures 1 and 3 taken together give a substantially complete side elevation of the machine.

Figure 4 is a fragmentary perspective view showing details of the forming mechanism drive.

In terms of broad inclusion, the box making machine embodying our invention comprises cutting and scoring dies. Means are preferably provided for feeding a supply of sheet material continuously into a loop, and means are provided for withdrawing the material from the loop and for feeding the same past the dies with an intermittent motion. Means timed with the intermittent feed are provided for operating the dies to cut and score the sheets and form blanks adapted to be folded into boxes.

Means are also preferably provided for treating the blanks with a protective material, and means are provided for applying glue to the blanks. Means timed with the glue applying means are provided for receiving a blank from the treating means and delivering the same to the glue applying means. A forming mechanism is provided for folding the blanks into boxes, and means timed with the latter mechanism are provided for receiving a blank from the glue applying means and delivering it to the forming mechanism.

Means are also provided for holding a nest of the boxes, and means are provided for driving the newly formed box into the nest. Means timed with the forming mechanism are provided for advancing the nest along the holding means, and means are preferably provided for marking the nest after a predetermined number of boxes have been added.

Figure 1:
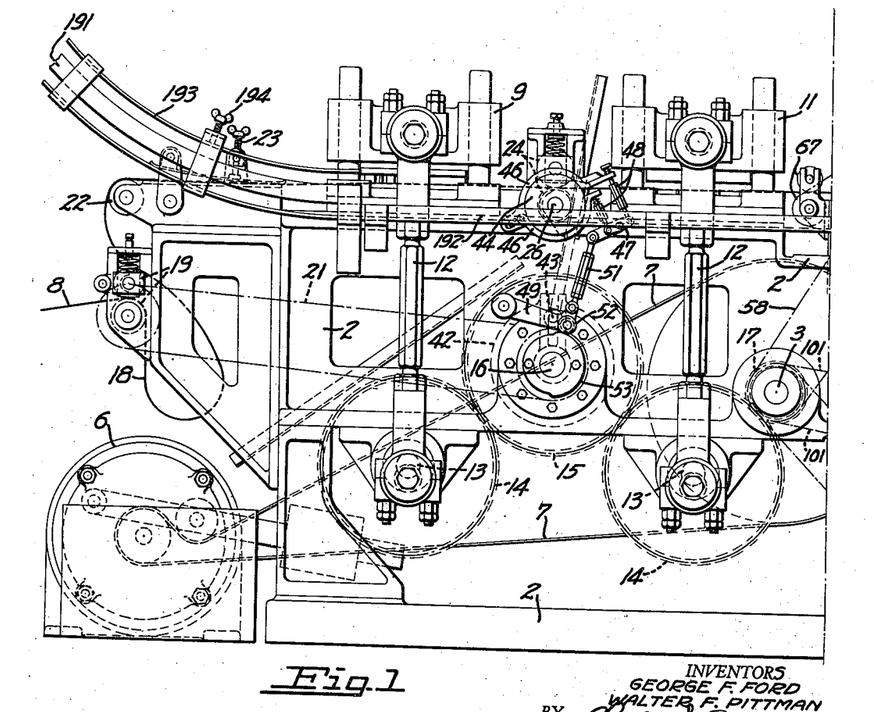
Figure 1 is a side elevational view showing a portion of a machine embodying the improvements of our invention.

In greater detail, and referring particularly to Figure 1, the box making machine embodying our invention comprises a frame 2 upon which is journaled a drive shaft 3. The latter shaft is connected for rotation with a motor 6 by means of a suitable belt drive 7.

Figure 2:
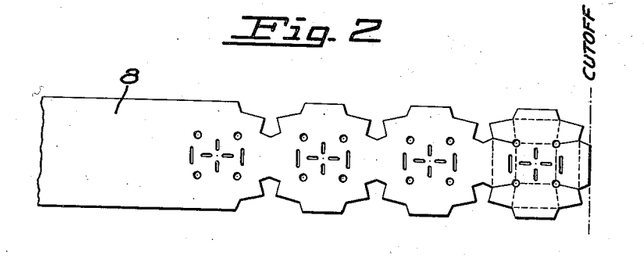
Figure 2 is a plan view showing portions of the strip material from which the blanks are formed, and illustrates the various steps of cutting and scoring in the process of making the blanks. The strip as shown in this figure is positioned in alignment with the machine units shown in Figure 1 to indicate the function and arrangement of the cutting and scoring dies.

*Cutting and scoring units.*—Suitable cutting and scoring dies are provided for forming blanks from a strip 8 of sheet material. Dies for piercing the sheet and cutting the outline of the blanks are carried by a head 9 slidably mounted on the frame 2. The scoring and other cutting dies (including the cut-off die) are carried by a similar head 11, also slidably mounted on the frame 2. The function of the cutting and scoring dies and the nature of the blanks which they form is shown in Figure 2.

The rough male dies are attached to the heads 9 and 11, while the smooth counter dies are positioned on the bed of the frame 2. By this arrangement the bed presents a smooth surface over which the strip 8 may be readily advanced.

The heads 9 and 11 are reciprocated by connecting rods 12 eccentrically mounted on suitable cross shafts 13. The shafts 13 each carry a gear 14 which mesh with a gear 15 journaled on an intermediate shaft 16. One of the gears 14 is meshed with a pinion 17 mounted on the drive shaft 3 so that when the motor 6 is running both of the die heads are reciprocated. The arrangement of the mechanism is such that both sets of dies operate simultaneously.

*Strip feeding mechanism.*—The strip 8 of sheet material is fed continuously into a loop 18 by a pair of rollers 19 journaled on the frame 2. One of the rollers is freely journaled and spring pressed, and the other is positively driven from the intermediate shaft 16 by a suitable chain drive 21. From the loop 18 the strip material passes over a roller 22, under a resilient tensioning device 23 and then under the die heads 9 and 11.

Figure 7:
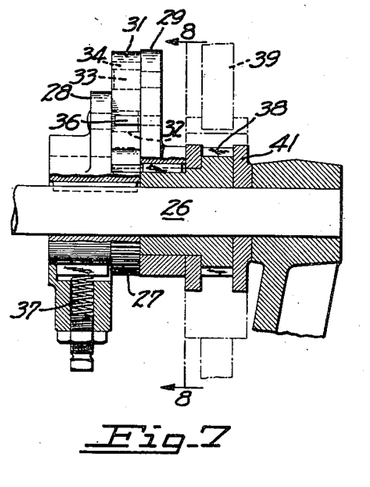
Figure 7 is a detail vertical sectional view showing portions of the intermittent drive mechanism, the plane of section passing through the axis of the roller shaft.
Figure 8:
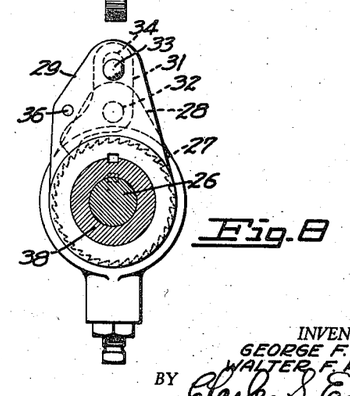
Figure 8 is a vertical sectional view taken in a plane indicated by the line 8—8 of Figure 7, and shows further details of the intermittent drive mechanism.

Means are provided for withdrawing the strip material from the loop 18 and moving it past the die units with an intermittent motion. For this purpose a pair of feed rollers 24 are provided between the die units. With particular reference to Figures 5 to 8, it will be observed that the upper roller 24 is spring pressed and is geared to the lower roller which is driven. The lower roller is mounted on a shaft 26 journaled on the frame 2. As best shown in Figure 7, a ratchet wheel 27 is mounted for rotation with the shaft 26. An arm 28 is loosely journaled on the hub of the wheel 27 and a complementary arm 29 is journaled on the shaft 26 on the opposite side of the wheel 27.

A dog 31 for engaging the ratchet wheel is arranged between the arms 28 and 29 and is pivotally mounted on a pin 32 secured on the arm 28. Another pin 33 is secured to the arm 29 and projects into an elongated aperture 34 in the dog 31, and a stop pin 36 is also secured to the arm 29. As viewed in Figure 8 it will be observed that this arrangement locks the arm 29 for rotation with the shaft 26 when the arm is rotated counter-clockwise, but permits free movement of the arm 29 in the clockwise direction. During the clockwise rotation the dog 31 is held completely out of engagement with the teeth of the ratchet wheel. The adjustable compression spring 37 in connection with the mounting of arm 28 urges the dog 31 toward the ratchet wheel.

The arm 29 is fixed for rotation with a gear 38 which in turn meshes with a reciprocating rack 39. The rack is held in engagement with the gear by a guide 41 journaled on the shaft 26. The rack 39 receives its reciprocating motion by being pivoted at its lower end to a wheel 42 mounted on the shaft 16; the pivot pin 43 being preferably adjustably mounted on the wheel 42 for the purpose of varying the length of stroke of the rack.

From the above mechanism it will be apparent that rotation of the shaft 16 imparts an oscillating motion to the arm 29 through the action of the rack and pinion. This oscillating motion is transmitted by the ratchet device to effect an intermittent rotation of the geared drive rollers 24, as will be well understood. In other words, the ratchet device operates as an overrunning clutch to effect rotation of the rollers 24 in one direction, but not in the other.

The proportion and arrangement of the parts in the intermittent drive mechanism is such that the sheet 8 is advanced the proper distance with respect to the cutting and scoring dies. The adjustably mounted pivot pin 43 at the end of the rack 39 provides an adjustment for altering the timing between the rotation of the feed rollers 24 and the reciprocation of the die heads 9 and 11. Of course it is understood that the advancement of the sheet 8 past the dies is effected while the dies are elevated and out of engagement with the sheet, and that the pin 43 is adjusted so that the amount of strip advanced by the rollers 24 is such as to properly position the blanks being formed with respect to the cutting and scoring dies.

Means are also provided for locking the feed rollers 24 against rotation during their period of rest, so as to insure that the strip 8 will not shift when the dies are in operation. For this purpose one end of the shaft 26 is provided with a brake drum 44. A pair of brake shoes 46 are pivotally mounted on the frame 2 and are arranged to encircle the drum. The brake is engaged and disengaged by a couple 47 pivotally mounted on the frame 2 and connected to the shoes by the arms 48.

The couple 47 is rotated by a lever 49 pivoted on the frame 2 and connected to the couple by a linkage 51, which lever carries a follower roller 52 riding on a cam 53 mounted for rotation with the shaft 16. Note Figure 5. When the feed roller 24 is being positively driven the cam 53 operates to disengage the brake. As soon as the roller is disconnected from its driving means however the cam 53 operates to engage the brake so as to hold the strip 8 against movement when the dies are operating.

Figures 3, 4:
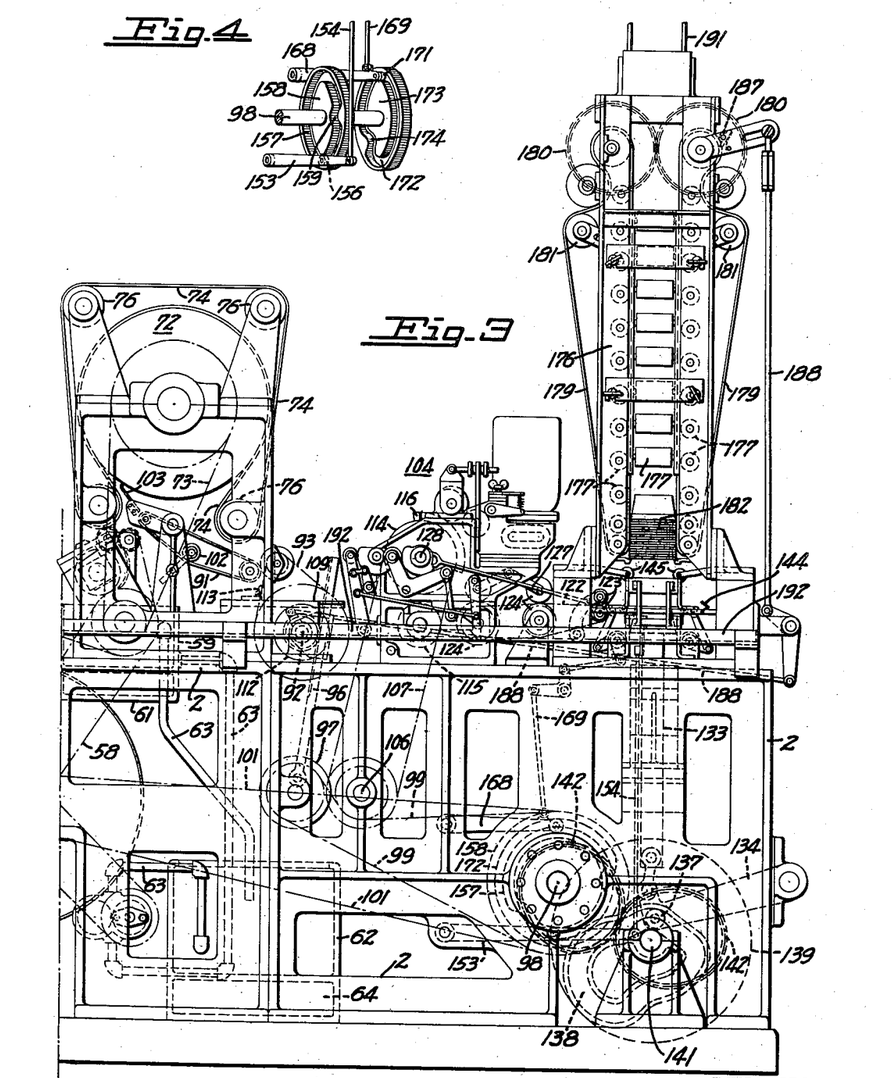
Figures 5, 6:
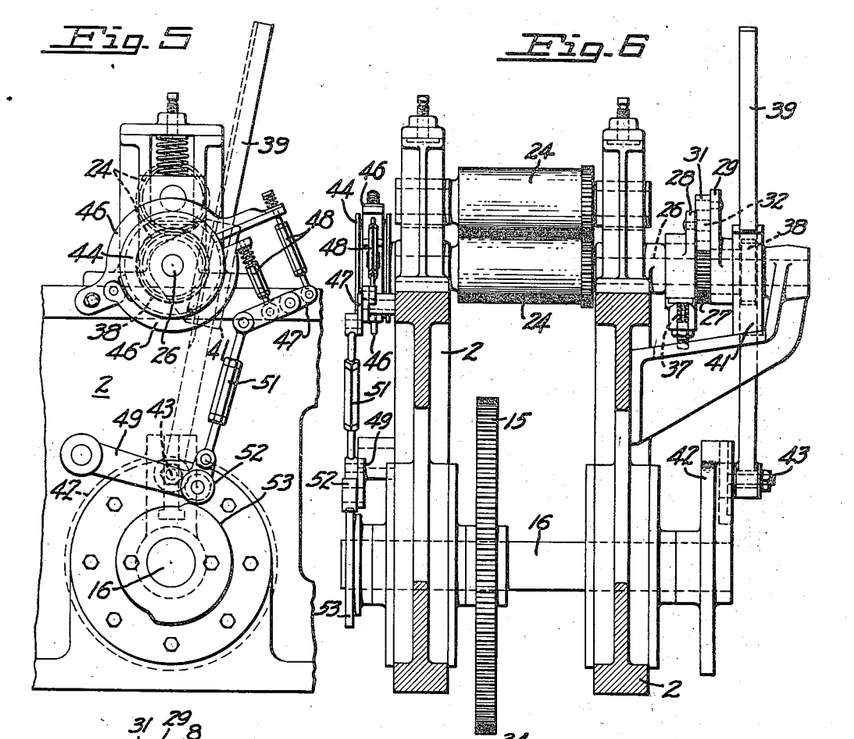
Figure 5 is a fragmentary side elevational view showing the intermittent drive mechanism.
Figure 6 is an end view thereof, taken in a plane extending transversely across the machine.
Figures 9, 10:
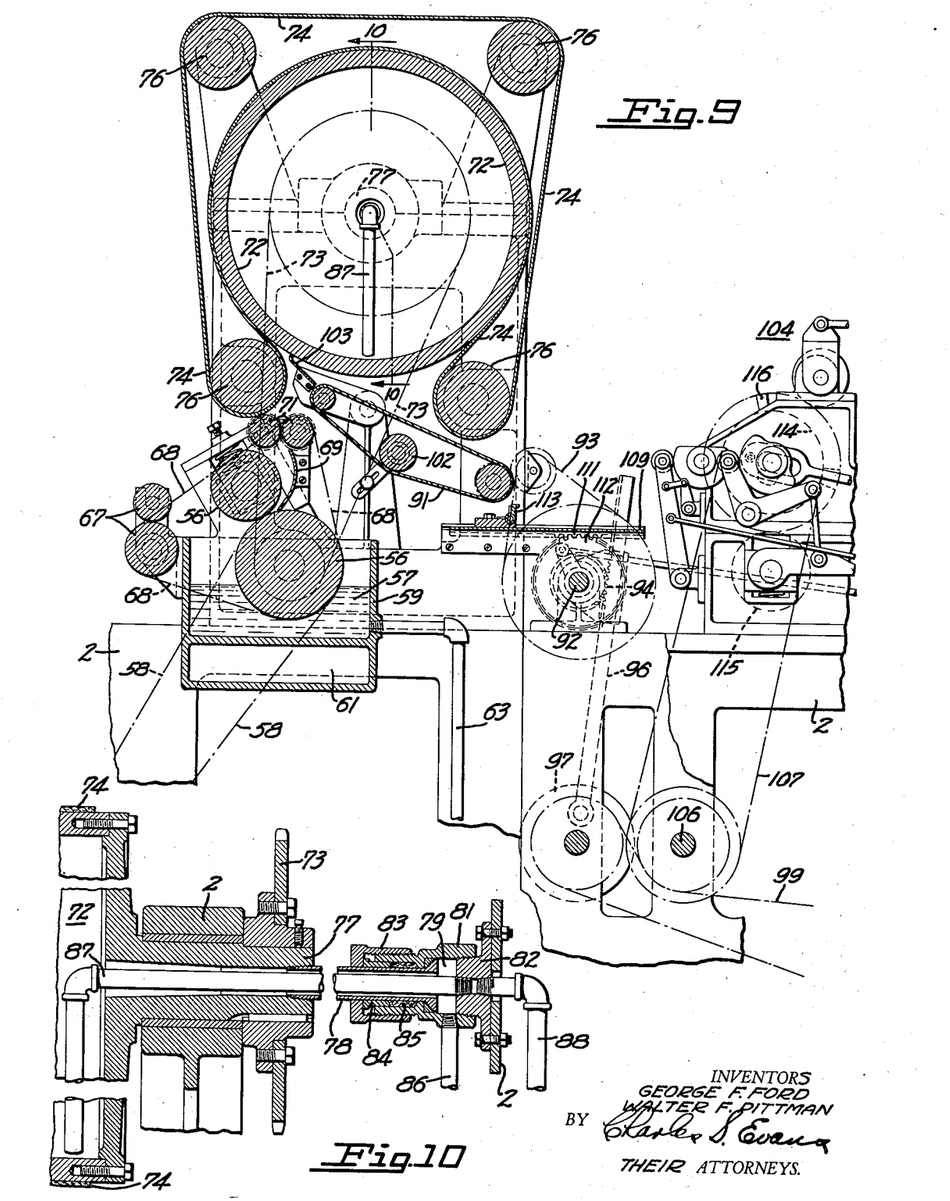
Figure 9 is a side view of the treating unit and portions of the gluing unit, the treating unit being shown in vertical section and the gluing unit in side elevation.
Figure 10 is a transverse vertical sectional view showing details of the steam connections for the treating unit, the plane of section being indicated by the line 10—10 of Figure 9.

*Treating unit.*—Means are provided for treating the newly formed blank with a protective fluid, preferably paraffine. Referring to Figures 3 and 9, the treating unit comprises a pair of applicator rolls 56, the lower of which runs in a bath 57 of paraffine. The upper roll 56 is freely journaled and spring pressed, while the lower roll is positively driven from the drive shaft 3 by a chain drive 58. The paraffine bath 57 is held by a container 59 having a chamber 61 communicating with a suitable source of live steam for maintaining the paraffine in molten condition. The container 59 is connected with a reservoir 62 by a circulating system 63, and the reservoir is also provided with a steam chamber 64 for maintaining the supply of paraffine in molten state.

As the blanks of material pass out from under the die head 11 they are engaged by a pair of feed rollers 67 and are advanced into engagement with the applicator rolls 56. A chain drive 68 connects the lower feed roll 67 for rotation with the lower applicator roll 56. Since the feed rolls 67 are rotating constantly, and since the blanks of material are discharged intermittently from the cutting and scoring dies, there will be intervals when no blanks are passing between the applicator rolls 56.

During these intervals the upper applicator roll is running in contact with the lower roll, and at such times receives paraffine from the lower roll so that when the next blank passes between the rolls it is coated on both sides with paraffine. As the blank passes out from between the applicator rolls it is directed upwardly by a guide 69 and into engagement with another pair of feed rollers 71, which rollers are geared together so that both are positively driven by the chain drive 68. One of the rollers 71 is preferably eccentrically mounted so that the spacing between the rollers may be adjusted to handle blanks of different thickness.

Means are provided for heat treating the coated blanks. The purpose of this treatment is to drive the paraffine into the sheet material so that glue will adhere to the blank surfaces. Another reason for this treatment is that the boxes offer a better appearance when the paraffine is driven into the body of the blanks and not left as a heavy coating on the surfaces thereof. As best shown in Figures 9 and 10, a steam drum 72 is journaled on the frame 2 and is connected for rotation with the applicator roll 56 by a suitable chain drive 73. A wide belt 74, preferably of felt, is provided to engage the major portion of the drum surface. The belt 74 is held about the drum by a plurality of freely journaled guide rollers 76.

As best shown in Figure 9, the feed rollers 71 direct the blanks between the belt 74 and the drums 72, so that the blanks are picked up and carried about the drum. While the blanks are carried on the drum they are pressed against the hot surface of the drum by the belt 74, and the heat and pressure serves to drive the paraffine from the surfaces into the body of the blanks, and particularly at the surface which is in contact with the hot drum.

The steam connections for the drum are shown in Figure 10. Here it will be seen that one end of the drum is provided with a neck 77 into which is threaded a tube 78. The flared end of the tube 78 terminates in a chamber 79 provided by a tubular member 81 threaded on a stud 82 bolted to the frame 2. A cap 83 on the member 81 bears against a sleeve 84 working against the packing 85. This construction provides a gland for the end of the rotating tube 78. A duct 86 communicating with a suitable supply of live steam is ported into the chamber 79 and thence may pass into the drum 72. For the purpose of removing condensed water from the bottom of the drum, a duct 87 is threaded into the boss 82 and arranged to extend through the tube 78 and terminate at a point adjacent the bottom of the drum. A discharge duct 88 is also threaded into the boss 82 and communicates with the duct 87. The steam pressure above the condensed water serves to drive the latter out through the discharge duct.

Means are provided for receiving a blank as it passes out from between the drum 72 and belt 74 and feeding it forward with that side of the blank uppermost which was previously down. This is accomplished by a reciprocating belt 91 operating under the drum 72, as is best shown in Figure 9. The belt 91 is reciprocated by being connected with a shaft 92 through a chain drive 93, which shaft carries a pinion 94 meshed with a reciprocating rack 96. The lower end of the rack 96 is pivoted to a disk 97 which is connected for rotation with a shaft 98 by a chain drive 99. As shown in Figures 1 and 3, the latter shaft is connected for rotation with the drive shaft 3 by a chain drive 101.

Means are provided for timing the operation of the treating unit with that of the cutting and scoring units. The movable elements of the treating unit and the periodic feed rollers 24 are all driven from the main drive shaft 3, and the proportioning of the various gears and linkages in the drive transmission to the treating unit is such that the drum 72 is rotated and the belt 91 reciprocated in time with the periodic advancement of the strip 8 by the feed rollers 24, so that the belt 91 is travelling backwards when a blank drops upon it from between the drum 72 and belt 74. Subsequent forward movement of the belt 91 therefore advances the blank ahead and with the side of the blank which was against the drum uppermost. An idler roller 102 is preferably provided for maintaining the belt 91 taut, and a plate 103 is provided adjacent the rear end of the belt 91 for the dual purpose of preventing a blank from accidentally moving back too far, and for scraping the drum to maintain it free of paraffine.

*Gluing unit.*—As best shown in Figures 3 and 9, a gluing unit 104 is provided on the frame 2 immediately ahead of the treating unit. The gluing unit is substantially the same as that described in our co-pending application, Serial No. 622,670, filed July 15, 1932, and consequently an extended explanation of the mechanism is unnecessary, suffice to say that this unit of the machine applies glue to selected portions of the blank. In the present machine the gluing unit is driven from a shaft 106 by a chain drive 107, which shaft in turn is driven by the chain drive 99. Both the gluing unit and the cutting and scoring units are thus driven from the main drive shaft 3. For the purpose of synchronizing the operation of the several units, the elements in the drive transmission to the gluing unit are proportioned so that the gluing unit will handle a blank each time one is formed by the dies.

Means timed with the operation of the gluing unit are provided for receiving a blank from the treating unit and delivering it to the gluing unit. As best shown in Figure 9, a reciprocating table 109 is slidably mounted on the frame 2. Reciprocating motion is imparted to the table by means of the rack teeth 111 provided on the table and meshing with a gear 112 mounted on the shaft 92. By this arrangement movement is imparted to the table by the same mechanism which reciprocates the belt 91. The table is arranged so that a blank discharged from the belt 91 falls upon it.

A pusher lug 113 is secured to the table for engaging the rear edge of the blank, so that in forward movement of the table the blank is advanced toward the gluing unit. The pusher lug 113 is so positioned that the forward or leading edge of the blank projects beyond the forward edge of the table 109. When the table is in the extended position the leading edge of the blank is engaged between the gluing roll 114 and the impression roll 115 of the gluing unit. As will be observed in Figure 9, the pusher lug 113 is pivotally mounted and is held upright by a spring. This yieldable mounting of the lug is a safety measure for preventing injury to the hand of an operator.

Figure 12:
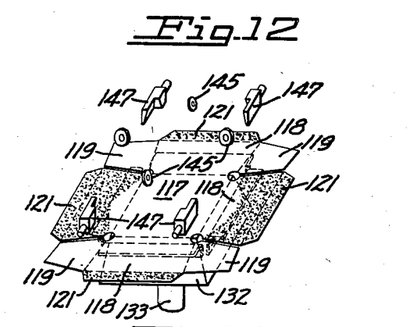
Figures 12 to 15, inclusive, illustrate the various steps in the folding of a blank.

As the blank passes between the gluing roll and impression roll of the gluing unit the glue pads 116 on the gluing roll apply glue on selected areas of the blank. This application of glue is on the side of the blank which contacted the drum of the heating unit. Since the paraffine is well driven in from the surface at this side the glue readily adheres. The arrangement of the glue deposits on the blank will be seen in Figure 12. Here it will be observed that the blank comprises a bottom wall 117, side walls 118 foldably connected to the edges of the bottom wall, side flaps 119 foldably connected to the end edges of opposite side walls, and sealing flaps 121 foldably connected to the outer edges of the side walls. The glue is applied over each of the sealing flaps 121 and also over portions of the side walls which do not carry side flaps.

Figure 11:
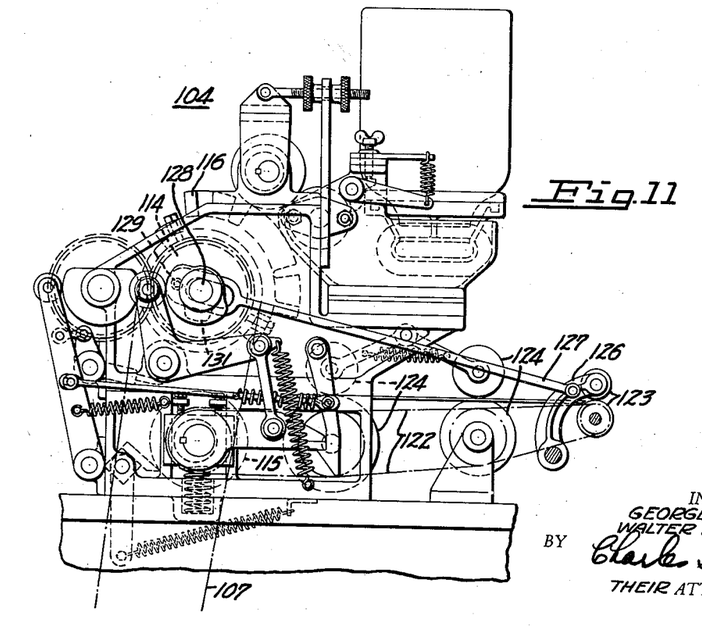
Figure 11 is a side elevational view of the gluing unit.

After leaving the gluing roll 114 the blank is fed forwardly by pairs of rollers 123 and 124, the bottom rollers of which are positively driven by a chain drive 122. The end feed rollers 123 are inactive however during certain intervals. As best shown in Figure 11, the upper feed roller 123 is pivotally mounted by an arm 126, and the position of the roller is controlled by a link 127 slidable on the glue roller shaft 128 and carrying a pin 129 with which a cam 131 carried by the shaft 128 may engage. As the gluing roll rotates, the upper feed roller 123 is intermittently moved into and out of operative engagement with the lower feed roller. Thus, means timed with the operation of the gluing roll are provided for controlling the instant at which a blank is discharged from the unit. From Figures 3 and 11 it will be seen that the end feed rollers 123 are driven faster than the preceding rollers 124. This speeds up the motion of the blank at this point and causes the latter to be shot quickly ahead into the forming mechanism.

Figure 16:
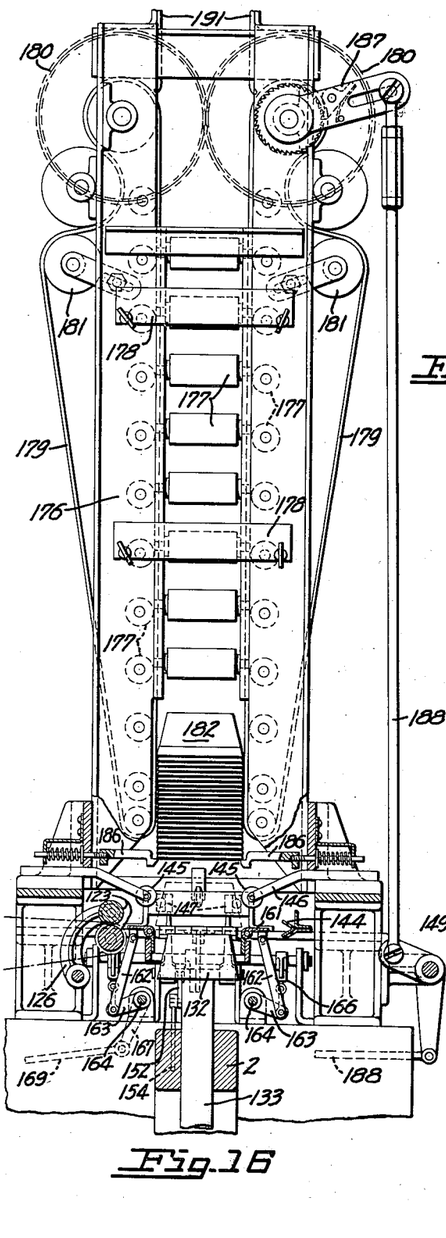
Figure 16 is a side view of the forming mechanism and box holding chute, the forming mechanism being shown in vertical section and the chute in side elevation.
Figure 17:
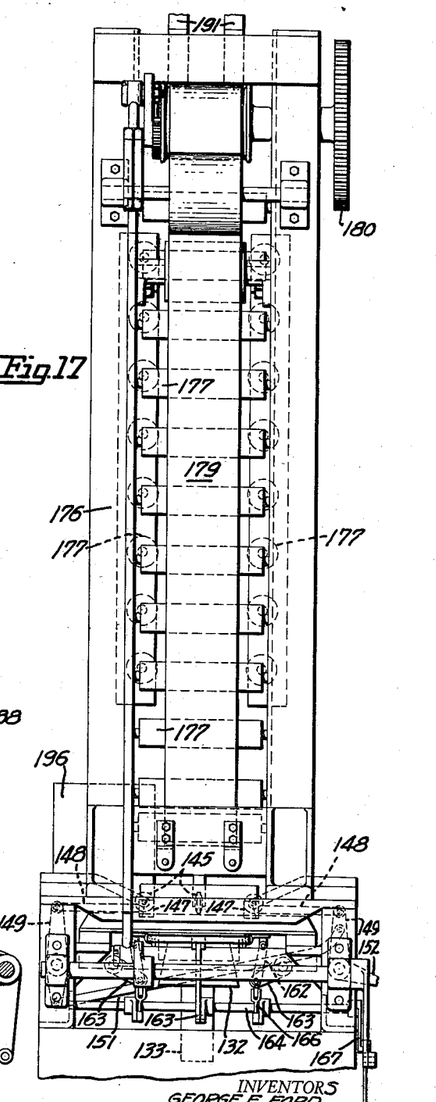
Figure 17 is an end elevational view of the structure shown in Figure 16.

*Forming mechanism.*—A forming mechanism, timed to operate with the preceding units of the machine, is provided for folding the blanks into boxes. Referring particularly to Figures 3, 16 and 17, the forming mechanism comprises a forming head 132 shaped to fit the interior of the box and carried on the upper end of a rod 133 slidably mounted in the frame 2. With particular reference to Figure 3, the lower end of the rod 133 is pivotally connected to a lever 134 pivoted on the frame 2. A follower roller 137 is mounted on the lever 134 and is adapted to ride in a camway 138 on a face plate 139 carried by a shaft 141 journaled on the frame 2.

The camway 138 is so shaped that when the disk 139 is turning counter-clockwise, as viewed in Figure 3, the forming head 132 is first elevated from its retracted position (indicated by solid lines in Figure 16) to an intermediate position of rest (indicated by the dotted lines in Figure 16). The camway then holds the forming head in the intermediate position of rest for a predetermined interval, then continues the upward movement of the head to the end of its upward stroke and finally allows the head to drop back to its retracted position for the beginning of another stroke.

During the time when the forming head is in its intermediate position of rest it is desired to have the disk 139 rotating more slowly than at other times, so that the forming head will have a relatively long period of rest in its intermediate position. Likewise it is desirable to have the several movements of the forming head effected rapidly. For the accomplishment of these results the shaft 141 carrying the cam disk 139 is driven through a pair of elliptical gears 142, one of which is mounted on the shaft 141 and the other on the shaft 98. These gears are positioned so that the shaft 141 is driven at substantially the slowest speed when the follower roller 137 rides over the constant radius portion of the camway.

It will be seen that the forming head is actuated by mechanism which is also driven from the main drive shaft 3 of the machine. By the proper proportioning of the elements in the drive transmission to the forming head the latter is made to complete a stroke each time a new blank is made by the die units.

Means are provided for quickly positioning a blank over the forming head 132 when the latter is in its retracted position. The intermittently operating feed rollers 123, described in conjunction with the gluing unit, enter into this operation. As has already been explained, the feed rollers 123 move into operative engagement to advance a blank in time with the operation of the gluing unit. This operative engagement of the feed rollers 123 is also timed with the movement of the forming head 132 by reason of the fact that the forming mechanism is synchronized with the gluing unit.

When the feed rollers 123 shoot a blank across the top of the retracted forming head the blank is stopped in its proper position by a suitable stop 144 positioned opposite the feed rollers 123. The stop 144 positions the blank so that the bottom wall 117 is directly over the top of the forming head. Note Figure 12.

The rapid movement of the blank into position over the forming head 132 is important because this reduces the amount of idle time required of the head in its retracted position, thus increasing the time available for the head in its intermediate position of rest and during which so much of the forming work is done.

Means are provided for folding the side walls 118 away from the bottom wall when the forming head moves upwardly to its intermediate position. For this purpose a plurality of elements or rollers 145 are provided so that the forming head may pass therebetween. As shown in Figure 16, the rollers 145 are preferably mounted on the ends of suitable arms 146 fixedly mounted on the frame 2.

Figure 13:
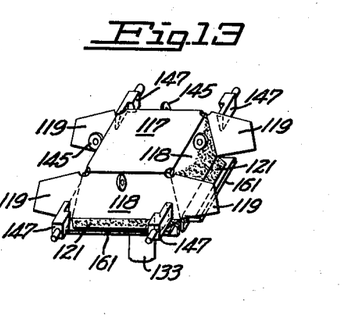

When the forming head is elevated to its intermediate position of rest it is moved against the blank so that the latter is driven between the rollers 145. As is shown in Figure 13 the rollers 145 bear against the extending side walls and cause them to be folded away from the bottom wall.

Figure 14:
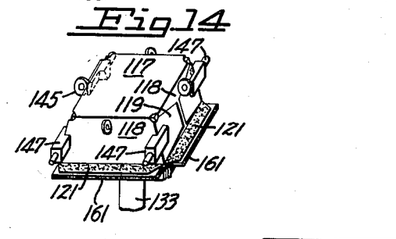

Means are provided for folding the side flaps 119 over the downfolded side walls 118. For this purpose a plurality of movable elements 147 are provided, which elements are adapted to move inwardly against the side flaps and fold the latter over the side walls. The positions of the elements 147 in their retracted and extended positions are shown in Figures 13 and 14.

As is best shown in Figure 17, the elements 147 are mounted on slidable arms 148 pivoted to levers 149 connected together by a link 151. One of the levers 149 is connected for movement with a lever 152 which lever is connected to another lever 153 by a depending rod 154. The latter lever carries a follower roller 156 running in a camway 157 formed in a disk 158, mounted for rotation with the shaft 98. This cam arrangement is best shown in Figure 4. The offset 159 in the camway 157 is positioned to time the movement of the elements 147 with the movements of the forming head 132 so that the elements 147 are extended when the forming head is in its intermediate position of rest.

Figure 15:
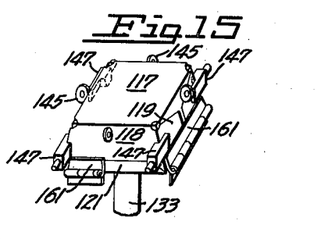

Means, also timed with the movements of the forming head 132, are provided for folding up the rim flaps 121 againsts the side walls 118 and over the folded side flaps 119. With particular reference to Figures 12, 13, 14 and 15, a plurality of hinged elements 161 are arranged in a plane so that the blank rests upon them when it is shifted into position over the forming head. When the forming head is moved upwardly and the fixed elements 145 fold the side walls 118 downwardly, the rim flaps 121 by reason of their resting on the hinged elements 161 are folded outwardly and away from the side walls, as shown in Figure 13. After the side flaps 119 have been folded against the side wall, as shown in Figure 14, the hinged elements 161 are moved upwardly to fold the rim flaps 121 against the side walls 118 and over the folded side flaps 119, as shown in Figure 15.

As has already been pointed out, the smooth counter dies were mounted on the frame bed to provide a smooth surface over which the strip 8 could be readily advanced. This however forms the scores from the wrong side of the blank to take care of the 180 degree fold of the rim flaps 119, unless the blank is turned bottom side up after it leaves the die unit and before it reaches the forming mechanism. Since this reversal of the blank was effected after leaving the treating unit the scores are properly arranged when the blank reaches the forming mechanism.

Referring particularly to Figures 16 and 17, the hinged elements 161 are actuated by links 162 connected to cranks 163 mounted on suitable shafts 164. The shafts are rotatably connected by suitable linkages 166. One of the shafts 164 carries a lever 167 which connects with a lever 168 through a linkage 169. The lever 168 is pivoted on the frame 2 and carries a follower roller 171 riding in a camway 172 formed in a disk 173 mounted on the shaft 98. Note Figure 4. The offset 174 in the camway 172 is positioned to actuate the hinged elements 161 when the forming head is in its intermediate position of rest; and this offset is positioned with respect to the offset 159 of the camway which operates the elements 147 so that the hinged elements are actuated to fold up the end flaps 121 after the side flaps 119 have been folded into position.

*Discharge chute.*—Means are provided for holding the newly formed boxes in nested relation while delivering the boxes for packing, and advantage is taken of this nested relation for pressing the glued surfaces of the boxes together while the glue is setting. As best shown in Figures 16 and 17, a vertical chute 176 is provided above the forming mechanism. The sides of the chute are formed by sets of rollers 177, one set of which is removably mounted by suitable brackets 178.

Conveyor belts 179 are arranged to extend over the rollers on two sides of the chute, and the belts are connected for movement together by a pair of gears 180. The tension in the belts is adjusted by suitable idler pulleys 181, and the reaches of the belts running along the sides of the chute are spaced apart a distance substantially equal to the width of the boxes, so that a nest or stack 182 of boxes is frictionally engaged by the conveyor belts. In other words, free movement of the nest 182 is prevented. Also, the nest may be shifted along the chute by moving the conveyor belts.

A newly formed box is deposited in the nest by the forming head 132 when the latter reaches its fully extended position. That is, immediately upon retraction of the elements 147 and lowering of the hinged elements 161, the camway 138 continues the upward movement of the forming head 132 to drive the newly formed box past the forming elements or rollers 145 and into the nest. In order to remove the box from the head and hold up the lower end of the nest, a pair of spring pressed dogs 186 are provided to engage under the rim of the lowermost box in the nest. Note Figure 16.

Means, operating in time with the movements of the forming head 132, are provided for driving the conveyor belts 179 to advance the nest along the chute. This is accomplished by a ratchet device 187 connected with the reciprocating table 109 by a suitable linkage 188. The timing between the reciprocating table 109 and the forming head 132 is of course such that a new blank is passed into the gluing unit each time a blank is folded by the forming unit. Consequently, advantage is taken of the reciprocating motion of the table to operate the ratchet device 187. The lever arms in the connecting linkage are such that the conveyor belts move the nest 182 upwardly just enough to permit the insertion of another box each time the forming unit operates. The adjustment of the conveyor movement is also made with the idea of effecting a comparatively tight fit when a newly formed box is inserted into the nest, so as to press the glued surfaces into firm contact.

The upper portion of the chute 176 is continued as a delivery chute 191, portions of which are shown in Figures 1, 3, 16 and 17, and which extends as an overhead chute terminating at the head of the machine, as shown in Figure 1. The nest of boxes continues about this overhead delivery chute and passes out on an elongated table or tray 192, from which an operator can break the nest into sections of a size convenient for packing. The upper strip 193 at the discharge end of the delivery chute is adjustably positioned by a screw 194 to frictionally engage the nest to prevent the boxes from sliding out under force of gravity.

Means are also preferably provided for marking the nest after a predetermined number have been added. Such a marking device may also include a counting device, and both are indicated diagrammatically in Figure 17 by the reference numeral 196. Any well known type of marking and counting device may be employed for this purpose. When the nest of boxes issues from the discharge end of the delivery chute an operator merely breaks the nest at the marked point and thereby removes a section containing a predetermined number of boxes and adapted to fit a packing case.

We claim:

1. A machine for making boxes from blanks comprising means for holding a nest of the boxes, a forming head shaped to fit the interior of the box, a plurality of movable elements between which the head is adapted to pass, means for positioning a blank between said head and elements, means for moving the head against the blank to drive the latter between the elements, means operating in time with the head moving means for moving said elements against portions of the blank for folding said blank about the head to form a box, and means for continuing movement of the head to drive the newly formed box past said elements and into the nest.

2. A machine for making boxes from blanks having a bottom wall, side walls foldably connected to the bottom wall, and side flaps foldably connected to ends of the side walls, comprising means for holding a nest of the boxes, a head shaped to fit the interior of the box, a plurality of elements between which the head is adapted to pass, means for positioning a blank between said head and elements, means for moving the head against the bottom wall of the blank to drive the blank between the elements, said elements being arranged to bear against the side walls for folding the latter away from the bottom wall, means timed with the operation of said head moving means for folding the side flaps over adjacent side walls, and means for continuing movement of the head to drive the newly formed box past said elements and into the nest.

3. A machine for making boxes from blanks having a bottom wall, side walls foldably connected to the bottom wall, and side flaps foldably connected to ends of the side walls, comprising a head shaped to fit the interior of the box, a plurality of elements between which the head is adapted to pass, means for positioning a blank between said head and elements, means for moving the head against the bottom wall of the blank to drive the blank between the elements, said elements being arranged to bear against the side walls for folding the latter away from the bottom wall, and means timed with the operation of said head moving means for folding the side flaps over adjacent side walls.

4. A machine for making boxes from a blank having a bottom wall, side walls foldably connected to the bottom wall, side flaps foldably connected to the ends of opposite side walls, and rim flaps foldably connected to the tops of the side walls, comprising a head shaped to fit the interior of the box, a plurality of elements between which the head is adapted to pass, means for positioning the blank between said head and elements, means for moving the head against the bottom wall of the blank to drive the blank between the elements, said elements being arranged to bear against the side walls for folding the latter away from the bottom wall, means for folding the side flaps over adjacent side walls, and means for folding the rim flaps over the side walls and over said folded side flaps.

5. A machine for making boxes from sheet material comprising means for cutting and scoring said sheet to form blanks, means for applying a protective fluid to the blanks, a drum, means for heating the drum, a belt running on the drum, means for feeding the blanks between the belt and drum, means for applying glue to the blanks, and means for folding the blanks into boxes.

6. A machine for making boxes from blanks comprising a receiver chute for holding a nest of the boxes, an extension chute connected with said chute for delivering the nest to a remote point, a conveyor belt in the receiver chute for controlling movement of the nest along said chute, means for folding the blanks into boxes, means for driving the newly formed boxes into said nest, means for moving the conveyor to advance the nest along the chute, and means at the discharge end of the extension chute for compressing the boxes together in the nest along the entire length of said chutes.

7. A machine for making boxes from blanks comprising a chute for holding a nest of the boxes, a conveyor belt in the chute for controlling movement of the nest along the chute, means for folding the blanks into boxes, means for driving the newly formed boxes into said nest, and means timed with said driving means for moving the conveyor to advance the nest along the chute.

8. A machine for making boxes comprising a reciprocating forming head having a period of rest between the ends of a stroke and during which the blank is formed about the head, a cam for moving the head, means for driving said cam, and a pair of elliptical gears interposed in said drive means, said gears being positioned so that the cam is moving substantially the slowest during the intermediate rest period of the head.

9. A machine for making boxes from sheet material comprising cutting and scoring dies, means for feeding the sheet material past the dies with an intermittent motion, means timed with said feeding means for operating the dies to cut and score the sheet and form blanks adapted to be folded into boxes, means for treating the blank with a protective material, means for applying glue to the blank, means timed with glue applying means for receiving a blank from the treating means and delivering the same to said glue applying means, a forming mechanism for folding the blanks into boxes, and means timed with the forming mechanism for receiving a blank from the glue applying means and delivering it to said forming mechanism.

10. A machine for making boxes from sheet material comprising vertically reciprocating cutting and scoring dies arranged with the smooth counter dies facing upwardly, means for feeding sheet material over the counter dies, means for operating the dies to cut and score the sheet and form blanks adapted to be folded into boxes, a forming mechanism including a vertically reciprocating forming head, means for feeding the blanks from the dies to a position over said forming head, and means interposed in said feeding means for reversing the blank.

11. A machine for making boxes from blanks comprising an operator's station, means for holding a nest of the boxes, means for folding the blanks in boxes and driving the newly formed boxes into said nest, means for delivering the nest to a point adjacent the operator's station, and means for compressing the boxes together in the nest at all times during delivery to said station.

12. A machine for making box blanks from sheet material comprising means for cutting the sheet to form the blanks, means for coating the blanks with paraffine, means for applying heat and pressure to the blanks to drive the paraffine into the body of said blanks, and means for applying glue to said blanks.

13. A machine for making box blanks from sheet material comprising means for cutting the sheet to form the blanks, means for coating the blanks with paraffine, means for applying heat and pressure to the blanks to drive the paraffine into the body of said blanks, said latter means applying a greater amount of heat to one side of the blank to more completely drive in the paraffine, and means for applying glue to the latter side of the blanks.

14. A machine for making boxes from blanks comprising means for holding a nest of the boxes, means for applying glue to the blanks, means for folding the blanks into boxes and driving the newly formed boxes into the nest, and means for compressing the boxes together in the nest.

GEORGE F. FORD.
WALTER F. PITTMAN.